United States Patent
Wang et al.

(10) Patent No.: US 6,401,925 B1
(45) Date of Patent: Jun. 11, 2002

(54) FAST-CURE SILYLATED POLYMER ADHESIVE

(75) Inventors: Xiaobin Wang; Brian J. Briddell, both of Jackson; Scott Kubish, Saline, all of MI (US)

(73) Assignee: Adco Products, Inc., Michigan Center, MI (US)

( * ) Notice: Subject to any disclaimer, the term of this patent is extended or adjusted under 35 U.S.C. 154(b) by 0 days.

(21) Appl. No.: 09/591,320

(22) Filed: Jun. 9, 2000

Related U.S. Application Data

(62) Division of application No. 09/218,573, filed on Dec. 22, 1998, now Pat. No. 6,124,387.

(51) Int. Cl.⁷ ............................. B65D 85/84; C08J 3/02
(52) U.S. Cl. ................ 206/524.6; 206/447; 206/524.3; 206/813; 524/251; 524/315; 524/356
(58) Field of Search ................................. 524/251, 315, 524/356; 206/447, 813, 524.3, 524.6

(56) References Cited

U.S. PATENT DOCUMENTS

| | | |
|---|---|---|
| 3,627,722 A | 12/1971 | Seiter |
| 3,632,557 A | 1/1972 | Brode et al. |
| 3,979,344 A | 9/1976 | Bryant et al. |
| 4,222,925 A | 9/1980 | Bryant et al. |
| 4,302,571 A | 11/1981 | Arai et al. |
| 4,562,237 A | 12/1985 | Okuno et al. |
| 4,597,801 A | 7/1986 | Stratta et al. |
| 4,625,012 A | 11/1986 | Rizk et al. |
| 4,889,903 A | 12/1989 | Baghdachi |
| 4,894,426 A | 1/1990 | Baghdachi et al. |
| 4,954,598 A | 9/1990 | Baghdachi et al. |
| 5,097,053 A | 3/1992 | Baghdachi et al. |
| 5,147,927 A | 9/1992 | Baghdachi et al. |
| 5,225,512 A | 7/1993 | Baghdachi et al. |
| 5,272,224 A | 12/1993 | Baghdachi et al. |
| 5,368,943 A | 11/1994 | Baghdachi et al. |
| 5,464,888 A | 11/1995 | Owen |
| 5,561,203 A  * | 10/1996 | Strong et al. ............... 525/477 |

FOREIGN PATENT DOCUMENTS

| | | |
|---|---|---|
| EP | 0 228 087 | 7/1987 |
| JP | 06016920 | 1/1994 |
| JP | 06057121 | 3/1994 |
| JP | 09302331 | 11/1997 |
| WO | WO 94/13723 | 6/1994 |

* cited by examiner

*Primary Examiner*—Robert Dawson
*Assistant Examiner*—Jeffrey B. Robertson
(74) *Attorney, Agent, or Firm*—Killworth, Gottman, Hagan & Schaeff, L.L.P.

(57) ABSTRACT

The cure-through rate of one-part silylated polymer adhesive/sealant compositions is improved by the addition of a small but effective amount of an alcohol-free hydrophilic solvent. The composition is particularly suitable for packaging in aluminum or aluminum-lined cartridges.

6 Claims, No Drawings

FAST-CURE SILYLATED POLYMER ADHESIVE

CROSS REFERENCE TO RELATED APPLICATIONS

This application is a division of U.S. patent application Ser. No. 09/218,573, now U.S. Pat. No. 6,124,387 filed Dec. 22, 1998.

FIELD OF THE INVENTION

The invention relates to one-part silylated polymer adhesive/sealant compositions, and more particularly to the use of a hydrophilic solvent to improve the cure-through rate of such adhesive/sealant compositions.

BACKGROUND OF THE INVENTION

Compositions containing vulcanizable silicon terminated organic polymers are well known in the art, and are commonly used as adhesives and/or sealants. For example, U.S. Pat. No. 3,632,557, incorporated herein by reference, describes room temperature curable silicon terminated organic polymers made by the reaction of an isocyanate terminated polyurethane prepolymer having urethane linkages and an organic silicon compound. Such polymers are commonly referred to as silylated polymers, and find use as adhesives and sealants, particularly in the automobile industry. Other patents relating to silylated polymers include U.S. Pat. Nos. 3,979,344; 4,222,925; 4,889,903; 4,894,426; 4,954,598 and 5,097,053, all incorporated herein by reference.

It is often desirable to provide such silylated polymer adhesive/sealant compositions in packages suitable for direct application of the product. A popular, efficient and economical type of package is an aluminum or aluminum-lined cartridge. Unfortunately, it has been discovered that such adhesive/sealant compositions often react with the aluminum, and corrode through the sides of such cartridges. Once the composition corrodes through the cartridge and is exposed to moisture in air, the curing process begins, and the adhesive/sealant solidifies before it can be used.

In using such adhesives and/or sealants, there are two important cure rates which need to be considered. The first is the surface cure rate, generally expressed as the tack-free time, that is, the time until the surface cures to the point of not being tacky. Generally, the application of the composition must be completed before such surface curing is complete. Therefore, the shorter the tack-free time, the less time one has to work with the adhesive/sealant. The second important cure rate is the cure-through rate. This is a measure of the time which it takes for the composition to cure through its thickness. The shorter the cure-through time, the sooner the finished product can be used. Therefore, it is often desirable to speed up the cure through rate of an adhesive/sealant while maintaining or even increasing the tack free time.

The present inventors made the discovery that methanol, which is commonly used in formulations of such adhesive/sealant compositions, reacts with aluminum when in the presence of the catalysts which normally are also included in such compositions. In an attempt to overcome the corrosion problem, the present inventors tested compositions prepared without methanol. Such compositions were found to be non-reactive with aluminum, and therefore to have a much longer shelf life in aluminum cartridges. Unfortunately, it was also found that the cure-through rate of silylated polymer adhesives and/or sealants without methanol was significantly slower than that of such adhesives/sealants with methanol. Increasing the amount of catalysts and using different catalyst systems did not improve the cure-through rate. In some cases, adding additional catalyst or using alternate catalysts was found to decrease the tack-free time significantly, thus making the adhesive/sealant more difficult to handle, but without improving the cure-through rate. Thus, there is a need for a methanol-free silylated polymer adhesive/sealant composition which is non-corrosive to aluminum with at least as fast a cure-through rate as compositions containing methanol.

DETAILED DESCRIPTION OF THE INVENTION

In accordance with the present invention, it was discovered that the addition of a small amount of one or more hydrophilic solvents to a one-part silylated polymer based adhesive/sealant composition speeds up the cure-through rate of such compositions. It was further discovered that the elimination of methanol solves the corrosion problem when such compositions are packaged in aluminum containers. Therefore, the present invention provides a silylated polymer-based adhesive/sealant composition comprising a small but effective amount of one or more hydrophilic solvents, which composition is substantially free of methanol and other alcohols. Adhesives and/or sealants made in accordance with the present invention are non-reactive with aluminum and have a faster cure-through rate than such compositions without the solvent. For purposes of this application, an effective amount of such a solvent is that amount which speeds up the cure-though rate of an adhesive/sealant composition as compared to the same adhesive/sealant composition without the solvent. A suitable method for determining the cure-through rate is set forth below.

In addition to avoiding methanol, it is believed that alcohols other than methanol, such as ethanol or propanol, should also be avoided in such compositions. Such alcohols may undesirably react with other components, particularly the silane components, thus adversely affecting the properties or performance of the adhesive/sealant compositions. Such reactions may also result in the formation of methanol as a byproduct. Therefore, the compositions of the present invention desirably are free of methanol and any other alcohols as well.

Another embodiment of the invention is a method of accelerating the cure-through rate of a one-part, moisture-curable silylated polymer-based adhesive/sealant composition comprising adding an effective amount of an alcohol-free hydrophilic solvent to the composition.

A further embodiment of the present invention is a packaged adhesive/sealant composition comprising:
a) an aluminum or aluminum-lined package; and
b) a one-part, moisture-curable silylated polymer-based adhesive/sealant composition comprising a moisture-curable silylated polymer and an effective amount of a hydrophilic solvent,
wherein the composition is sealed within the package, is substantially free of alcohols and is non-reactive with the aluminum of the package.

Although applicants do not wish to be bound by a particular theory of how the invention works, it is believed that when the hydrophilic solvent evaporates from the adhesive/sealant composition it creates channels for moisture to get into the adhesive/sealant and thereby cure the silylated polymer. If there is no hydrophilic solvent in the composition, then the moisture has more difficulty reaching the interior of the uncured material. As a result, although the tack-free time remains the same or even increases, the cure-through time is significantly diminished.

Hydrophilic solvents are those which have an affinity with water. However, because the silylated polymer compositions are cured by exposure to water, the solvents should be as anhydrous as is reasonably possible. Suitable hydrophilic solvents for use in the present invention should be highly volatile, and include those oxygen and/or nitrogen containing organic solvents whose flash points are less than about 45° C. (open cup) and whose evaporation rates are at least 1, with n-butyl acetate defined as having an evaporation rate of 1. However, alcohols should not be used in the solvent because of possible undesirable reactions with aluminum in the packaging or with other components of the composition. Suitable hydrophilic solvents include substituted or unsubstituted esters, ketones and amines, provided they are sufficiently volatile and non-reactive with the other components of the compositions. Among the hydrophilic solvents suitable for use in the present invention are esters such as amyl formate, ethyl acetate, isopropyl acetate, n-propyl acetate, ethyl propionate, isobutyl acetate and n-butyl acetate; ketones such as acetone, methyl ethyl ketone, methyl propyl ketone and methyl isobutyl ketone; amines such as isopropylamine, sec-butylamine, n-amylamine, sec-hexylamine, ethylamine, ethylene diamine, propyl imine, acetonitrile, n-butyronitrile and morpholine; mixture of such solvents and mixtures of them with other anhydrous solvents, especially their azeotropes.

The small amount of hydrophilic solvent used in the composition is not critical, but preferably should be as small as possible. Preferably no more than about 10 percent by weight (wt %) is used, more preferably less than about 6 wt %, and most preferably less than about 3 wt %. To obtain the desired cure-through rate acceleration, preferably a minimum of about 0.1 wt % is used, more preferably at least about 0.5 wt %, and most preferably at least about 1 wt %. Thus, the amount of hydrophilic solvent used is desirably in the range of about 0.1 to about 10 wt %, preferably from about 0.5 to about 6 wt %, more preferably from about 1 to about 3 wt %. All percentages herein are by weight unless indicated otherwise.

The following test methods were employed in the examples set forth below. Tack-free time was measured in accordance with ASTM C679-87 (Reapproved 1992) entitled "Standard Test Method for Tack-Free Time of Elastomeric Sealants," incorporated herein by reference. As indicated in the ASTM standard, the test consists of lightly touching a surface of a curing sealant with a polyethylene film at regular intervals until the sealant does not attach itself to the film and the film appears clean when peeled from the surface.

The cure-through rate of adhesive samples is measured by the following procedure. A sample of the test adhesive is prepared and conditioned to 23° C. for at least 6 hours. A polyethylene container is provided which is as least 45 mm in diameter and 10 mm in height, and purged with dry nitrogen. The container is filled with the test adhesive, and the top surface leveled with a spatula. The sample is placed in a 23° C., 50% relative humidity (RH) chamber, in which it cures from the top surface down. After 24 hours, the central thickness of the cured disk-like top portion of the sample is measured.

The materials used in the following examples are all commercially available and/or may be prepared by methods well known in the art, as discussed, for example, in some of the references incorporated by reference above.

EXAMPLE 1

Preparation of a Silylated Polyurethane Polymer

A typical silylated polyurethane polymer was prepared for use in testing the present invention. The formulation of the silylated polyurethane polymer was as follows:

TABLE 1

| Raw Material | Amount, g |
| --- | --- |
| PPG-2200 (2000 MW polyether diol from ARCO) | 1179.58 |
| TDI-80 (toluene diisocyanate) | 123.14 |
| Toluene | 96.41 |
| METACURE ™ T-1 (dibutyltin diacetate from Air Products) | 0.58 |
| Acetic Acid | 0.29 |
| SILQUEST ® A-1110 (γ-aminopropyltrimethoxysilane from OSi Specialties) | 43.03 |

All of the raw materials except the A-1110 were charged to a clean and dry reactor. The temperature was raised to 60° C. and maintained for about 2 hours. The A-1110 was not added until the NCO percentage dropped to 0.708. The temperature was then cooled down to 37.8° C. The NCO percentage was reduced to zero in about 15 minutes. This completed the formation of the silylated polyurethane polymer.

EXAMPLE 2

Preparation of a Silylated Polyether Polymer

A typical silylated polyether polymer was prepared for use in testing the present invention. The formulation of the silylated polyether polymer was as follows:

TABLE 2

| Raw Material | Amount, g |
| --- | --- |
| ACCLAIM ™ 12200 (12000 MW polyether diol from ARCO) | 1348.27 |
| SILQUEST ® Y-5187 (γ-isocyanatopropyltrimethoxysilane from OSi Specialties) | 123.14 |
| METACURE ™ T-1 (dibutyltin diacetate from Air Products) | 0.58 |
| Acetic Acid | 0.29 |

All of the raw materials were charged to a clean and dry reactor. The temperature was raised to 60° C. and maintained for about 3 hours until all hydroxyl groups were consumed. This completed the formation of the silylated polyether polymer.

EXAMPLE 3

Silylated Polyurethane Adhesive/Sealant Compositions

This example tests the tack-free times and cure-through rates of adhesive/sealant compositions made with the silylated polyurethane polymer of Example 1 with and without a hydrophilic solvent, in this case n-propyl acetate, in accordance with the present invention. These samples were all prepared without methanol or any other alcohol. Test samples were made as follows:

TABLE 3

| Ingredient | Amount, g | | | |
| --- | --- | --- | --- | --- |
| | A | B | C | D |
| Polymer of Example 1 | 633.6 | 633.6 | 633.6 | 633.6 |
| REGAL ® 300R (carbon black from Cabot Corp.) | 300.0 | 300.0 | 300.0 | 300.0 |
| POLYCAT ® DBU (1,8-diaza-bicyclo (5,4,0) undecene-7 from Air Products) | 1.22 | 2.44 | 1.22 | 1.22 |
| METACURE ™ T-1 | 1.22 | 2.44 | 1.22 | 1.22 |
| SILQUEST ® A-1 120, N-beta-(aminoethyl)-gamma-aminopropyltri-methoxysilane from OSi | 4.00 | 4.00 | 4.00 | 0.00 |
| SILQUEST ® Y-5187 | 0.00 | 0.00 | 0.00 | 4.00 |
| Toluene | 60.00 | 57.56 | 30.00 | 30.00 |
| n-Propyl acetate | 0.00 | 0.00 | 30.00 | 30.00 |

Tack-free times and cure-through rates were tested in accordance with the above-described procedures. The results were as follows:

TABLE 4

| | A | B | C | D |
| --- | --- | --- | --- | --- |
| Tack-free time @23° C./50% RH, min. | 15 | 9 | 10 | 27 |
| Cure-through rate @23°C./50% RH in 24 h, mm | 4.8 | 4.9 | 6.0 | 6.0 |

Sample A is a comparative example prepared without methanol or any other alcohol, and also without any hydrophilic solvent. Sample B is essentially the same composition, but with twice the dosage of the catalysts (POLYCAT® DBU and METACURE™ T-1). The results in Table 4 show that the additional catalyst undesirably reduced the tack-free time without any significant effect on the cure-through rate. Sample C, which included hydrophilic solvent in accordance with the present invention, had the same amount of catalyst as Sample A. Yet, the cure-through rate was significantly improved over the rates of Samples A and B. Sample D is another example using a hydrophilic solvent in accordance with the present invention. In this case, Y-5187 cyanato-silane was used instead of A-1120 amino-silane. The cure-through rate was the same as that of Sample C, although the tack-free time was significantly increased. This shows that compositions can be made in accordance with the present invention which not only increase the cure-through rate, but also increase the tack-free time. That is, while the total cure-through time is shortened, the tack-free time, during which the adhesive/sealant is workable, is increased. This data demonstrates that in comparison to other silanes, amino-silanes, such as SILQUEST® A-1120 or A-1110, shorten tack-free time without improving the total cure-through rate.

EXAMPLE 4

Silylated Polyether Adhesive/Sealant Compositions

Samples of silylated polyether adhesives were formulated as follows:

TABLE 5

| Ingredient | Amount, g | |
| --- | --- | --- |
| | E | F |
| Polymer of Example 2 | 673.6 | 673.6 |
| REGAL ® 300R, carbon black | 300.0 | 300.0 |
| POLYCAT ® DBU, catalyst | 1.22 | 1.22 |
| METACURE ™ T-1 | 1.22 | 1.22 |
| SILQUEST ® Y-5187, silane | 4.00 | 4.00 |
| Toluene | 20.00 | 0.00 |
| n-Propyl acetate | 0.00 | 20.00 |

TABLE 6

| | E | F |
| --- | --- | --- |
| Tack-free time @23° C./50% RH, min | 24 | 23 |
| Cure-through rate @23° C./50% RH in 24 h, mm | 5.9 | 6.9 |

In this Example, Sample E was prepared with toluene, which is not a hydrophilic solvent, and Sample F was prepared with n-propyl acetate, which is a hydrophilic solvent in accordance with the present invention. The use of the hydrophilic solvent in Sample F significantly improved the cure-through rate without significantly affecting the tack-free time.

EXAMPLE 5

MS Polymer Sealants

Sealant compositions were prepared from Kaneka MS Polymers, which are described by the manufacturer as silyl-terminated polyethers for non-isocyanate and moisture-curable polymer systems. Sample G was prepared in accordance with the manufacturer's recommendations. Sample H is identical to Sample G, except the amount of catalyst (NEOSTANN™ U220 catalyst from Nitto Kasei Co) was doubled. Sample I is the same as Sample G, except 45.9 g of a hydrophilic solvent (n-propyl acetate) was added in accordance with the present invention.

TABLE 7

| Ingredient | Amount, g | | |
| --- | --- | --- | --- |
| | G | H | I |
| S203H, MS polymer from Kaneka Corp. | 300.0 | 300.0 | 300.0 |
| S303H, MS polymer from Kaneka Corp. | 200.0 | 200.0 | 200.0 |
| DUP, plasticizer | 275.0 | 260.0 | 229.0 |
| Gama-Sperse ® CS-11, stearate surface modified calcium carbonate from Georgia Marble Corp. | 600.0 | 600.0 | 600.0 |
| $TiO_2$ | 100.0 | 100.0 | 100.0 |
| TINUVIN ® 327, 2-(5-chloro-2H-benzotriazole-2-yl)-4,6-bis (1,1-dimethylethyl)-phenol from Ciba Geigy Co. | 10.0 | 10.0 | 10.0 |
| TINUVIN ® 770, decanedioic acid, bis(2,2,6,6-tetramethyl-4-piperidinyl)ester from Ciba Geigy Co. | 10.0 | 10.0 | 10.0 |
| SILQUEST ® A-171, vinyltrimethoxysilane from OSi | 10.0 | 10.0 | 10.0 |
| SILQUEST ® A-1 120, N-beta-(aminoethyl)-gamma-aminopropyltrimethoxysilane from OSi | 15.0 | 15.0 | 15.0 |
| NEOSTANN ™ U220 catalyst from Nitto Kasei Co. | 10.0 | 20.0 | 10.0 |
| n-Propyl acetate | 0.0 | 0.0 | 45.9 |

Tack-free times and cure-through rates were tested as in the previous example. The results were as follows:

TABLE 8

|  | G | H | I |
|---|---|---|---|
| Tack-free time @23° C./50% RH, min. | 24 | 19 | 23 |
| Cure-through rate @23° C./50% RH in 24 h, mm | 3.8 | 3.8 | 4.2 |

These results show that doubling the amount of catalyst in Sample H reduced the tack-free time, but had no effect on the cure-through rate. On the other hand, adding hydrophilic solvent in Sample I increased the cure-through rate about 10% without significantly reducing the tack-free time.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

We claim:

1. A packaged adhesive/sealant composition comprising:
   a) an aluminum or aluminum-lined package; and
   b) a one-part, moisture-curable silylated polymer-based adhesive/sealant composition comprising a moisture-curable silylated polymer and an amount of a hydrophilic solvent effective to accelerate the cure-through rate of said adhesive/sealant composition,
   wherein said composition is sealed within the package, is substantially free of alcohols, and is non-reactive with the aluminum of the package.

2. The packaged adhesive/sealant composition of claim 1 wherein the package is an aluminum or aluminum-lined cartridge suitable for direct application of the composition.

3. The packaged adhesive/sealant composition of claim 1 wherein said hydrophilic solvent is present in an amount of about 0.1 to about 10 weight percent, based on the total weight of the composition.

4. The packaged adhesive/sealant composition of claim 1 wherein said hydrophilic solvent is selected from the group consisting of oxygen and nitrogen containing organic solvents and mixtures thereof, and has a flash point of less than about 45° C. (open cup) and an evaporation rate of at least 1, with n-butyl acetate defined as having an evaporation rate of 1.

5. A packaged adhesive/sealant composition comprising:
   a) an aluminum or aluminum-lined package; and
   b) an adhesive/sealant composition comprising a moisture-curable silylated polymer selected from the group consisting of silylated polyurethanes, silylated polyethers, and combinations thereof, and from about 0.1 to about 10 weight percent of a hydrophilic solvent;
   wherein said composition is sealed within said package, is substantially free of alcohols, and is non-reactive with the aluminum of said package.

6. The packaged adhesive/sealant composition of claim 5 wherein said hydrophilic solvent comprises one or more esters selected from the group consisting of amyl formate, ethyl acetate, isopropyl acetate, n-propyl acetate, ethyl propionate, isobutyl acetate and n-butyl acetate.

* * * * *

UNITED STATES PATENT AND TRADEMARK OFFICE
CERTIFICATE OF CORRECTION

PATENT NO.   : 6,401,925 B1
DATED        : June 11, 2002
INVENTOR(S)  : Wang et al.

It is certified that error appears in the above-identified patent and that said Letters Patent is hereby corrected as shown below:

Column 5,
Line 12, "SILQUEST®A-1 120" should be -- SILQUEST® A-1120 --;

Column 6,
Line 14, insert -- Tack-free times and cure through rates were tested as in the previous example. The results were as follows: --
Line 61, "SILQUEST®A-1 120" should be -- SILQUEST® A-1120 --.

Signed and Sealed this

Twenty-sixth Day of November, 2002

*Attest:*

JAMES E. ROGAN
*Attesting Officer*   *Director of the United States Patent and Trademark Office*